T. BREAKELL.
FILTERING APPARATUS.
APPLICATION FILED MAR. 12, 1910.

1,064,702.

Patented June 17, 1913.

3 SHEETS—SHEET 1.

WITNESSES

INVENTOR
Thomas Breakell

T. BREAKELL.
FILTERING APPARATUS.
APPLICATION FILED MAR. 12, 1910.

1,064,702.

Patented June 17, 1913.

3 SHEETS—SHEET 2.

WITNESSES
W. P. Burtz
John A. Percival

INVENTOR
Thomas Breakell
BY Wm. Wallace White
ATTY.

UNITED STATES PATENT OFFICE.

THOMAS BREAKELL, OF WIRKSWORTH, ENGLAND.

FILTERING APPARATUS.

1,064,702.

Specification of Letters Patent. Patented June 17, 1913.

Application filed March 12, 1910. Serial No. 549,057.

*To all whom it may concern:*

Be it known that I, THOMAS BREAKELL, a subject of the King of Great Britain and Ireland, and residing at Brassington Hall, Wirksworth, in the county of Derby, England, have invented certain new and useful Filtering Apparatus, of which the following is a specification.

This invention relates to apparatus for separating liquids from materials and for washing and saturating materials with liquids as, for example, in the treatment of slimes in the recovery of precious metals and more particularly in the treatment of gold ore slimes by the cyanid process in which process it is usual to treat the slimes with a "strong" solution, then to wash the residue with a "weak" solution and afterward with a "wash" water.

The main object of the present invention is to obtain a separation of the filtered liquid into two or more parts, as may be required, in the same machine and the aforesaid operations carried on simultaneously.

The invention is applicable to the type of apparatus comprising a revolving barrel having a filtering medium arranged around its periphery, means for withdrawing air and any filtered liquid from the interior of the barrel, and means for applying the slime and removing the residue from the exterior surface of the barrel.

Further objects of my invention are to provide means for insuring that the slime is applied evenly and of a uniform thickness to the filtering surface; that the application of the "weak" solution and "wash" water is effected evenly across the surface of the material being treated; that the removal of the residue is effected evenly so as to prevent the formation of grooves or ridges on the surface of the filter; and that there shall be no leakage of air through the filtering medium at the part where the residue is removed. These devices render the working of the apparatus as perfect and economical as possible and cause the division of the several solutions to be as clean as possible from one another.

Figure 1:
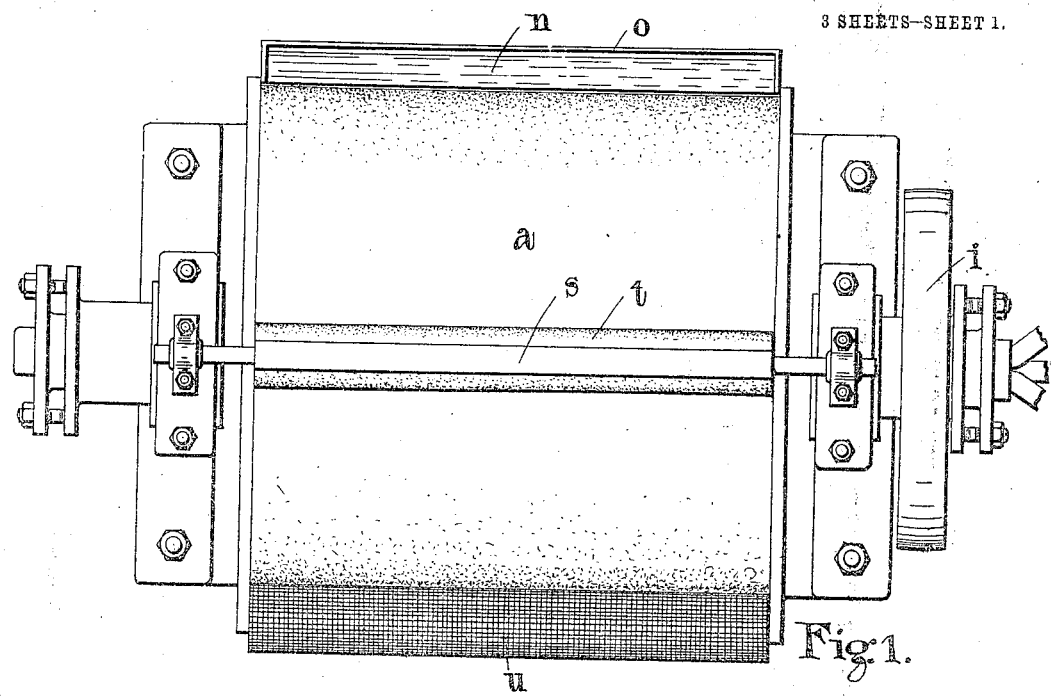
Figure 2:
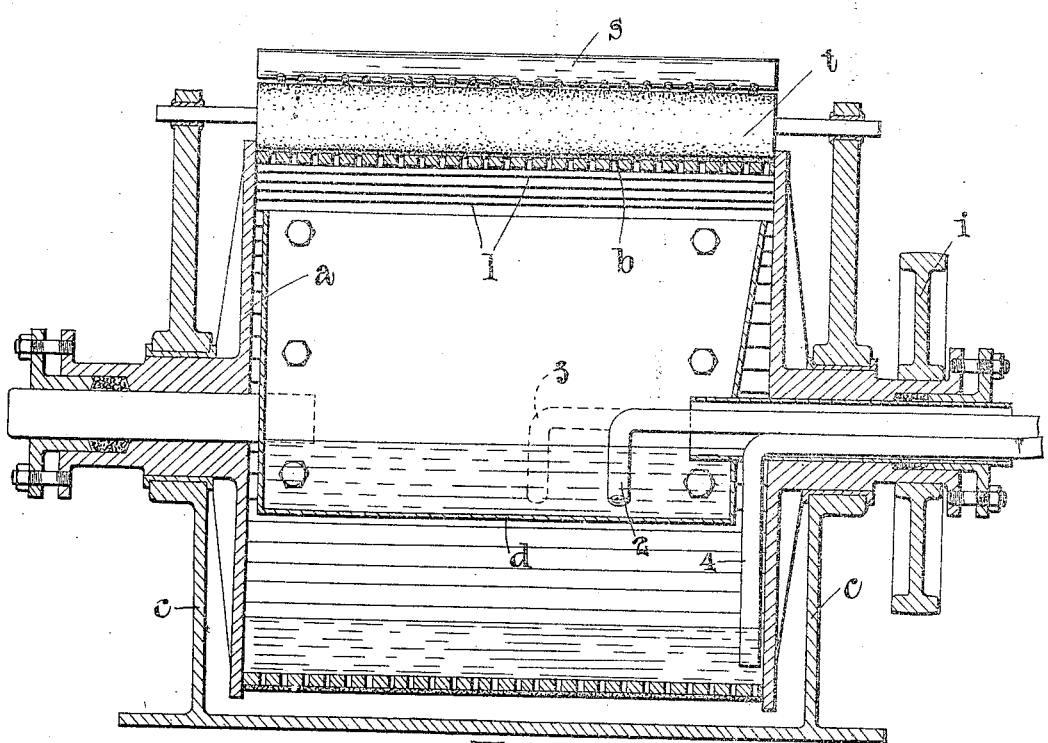
Figure 4:
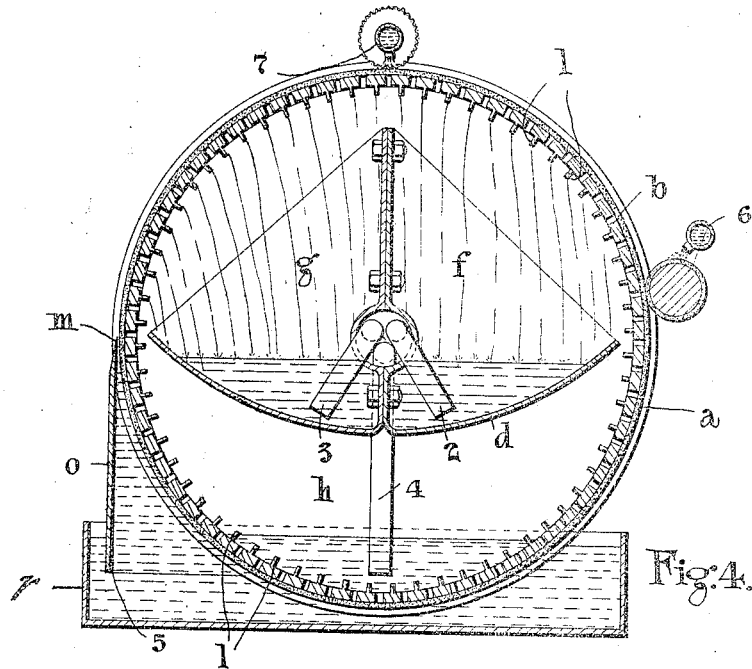
Figure 3:
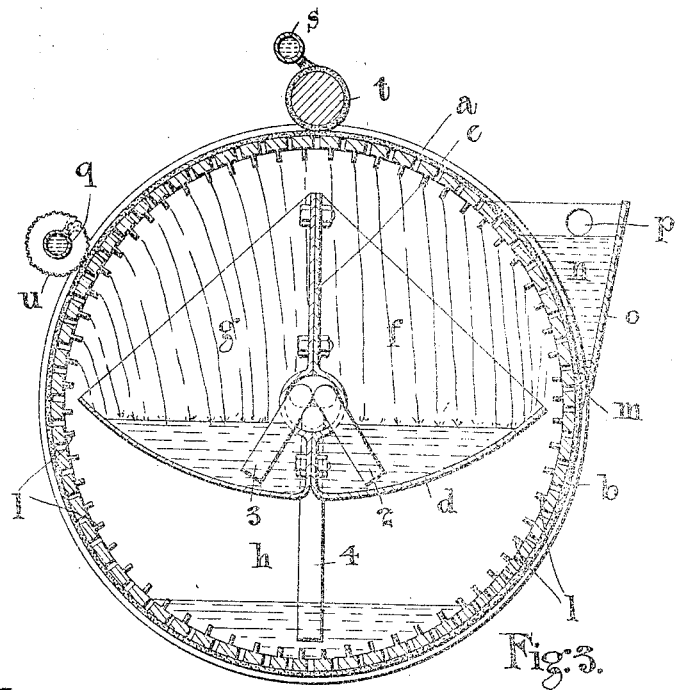
Figure 5:
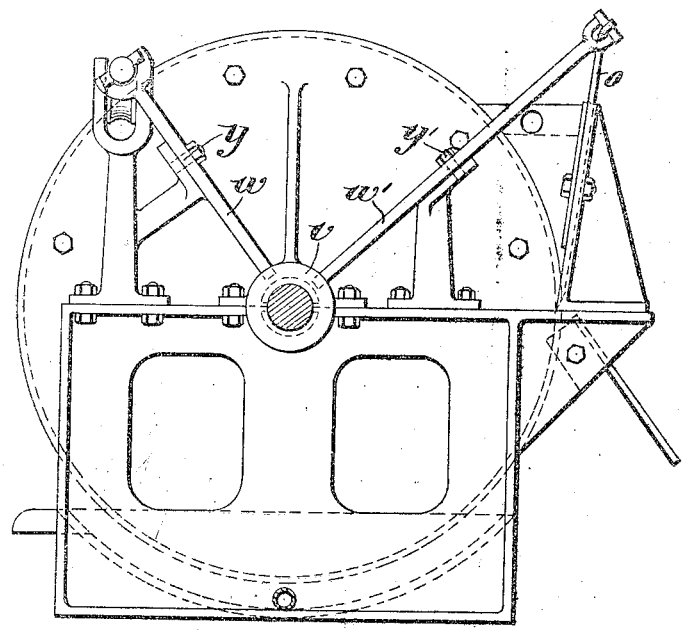

Referring now to the accompanying drawings which illustrate apparatus constructed according to the invention:—Figure 1 is a plan view of one form of the apparatus, Fig. 2 is a sectional elevation of the same; Fig. 3 is a cross section of the same, Fig. 4 shows a modified manner of arranging the residue removing means; and Fig. 5 is an end view of an apparatus showing certain details hereinafter referred to.

Referring first to Figs. 1 to 3, $a$ designates the barrel having a filtering surface $b$ and arranged to rotate on any suitable supporting frame $c$ through the medium of a driving pulley $i$. Within the barrel is arranged a stationary receptacle $d$ divided by a partition $e$ into two compartments $f$ and $g$ each of which preferably extends, as shown in Fig. 3, across about one half of the interior of the barrel and also throughout substantially the whole length of the barrel. A space $h$ is left beneath the receptacle inside the barrel.

A series of ribs or projections $l$ are provided all around the inside periphery of the barrel in order to prevent the liquid which passes through the filtering medium $b$ from adhering to the inner surface or running down the same into the bottom of the barrel. These ribs or projections $l$ cause the liquid to drip off their ends and fall into the receptacle $d$ as hereinafter described.

The slime is fed on to the barrel at or about the middle of the rising side. The means shown for effecting this comprises a slime receptacle or container $n$ formed by a knife or scraper element $o$ the lower edge $m$ of which serves to remove the residue by being arranged close to the filtering surface $b$. Means are provided, if necessary, to prevent the material escaping through the ends of the slime container $n$ said means comprising end plates attached to the knife and shaped to suit the curvature of the barrel. By this arrangement of the knife there is no possibility of air being drawn directly through any portion of the surface of the barrel filter $b$ since every portion is covered by a layer of material. Means are also preferably provided for maintaining the level of the slime constant. This is effected by providing an overflow pipe $p$ from the container $n$ and providing means for feeding the slime into the container at a greater rate than it is taken up by the barrel. The surplus which passes out by the overflow pipe $p$ is returned by a pump direct to the container or to a suitable tank arranged above the level of the container into which it flows by gravitation.

In the operation of this apparatus the liquid which passes through the filtering medium *b* from the freshly applied slime drips off the adjacent ribs *l* into the compartment *f* of the receptacle *d* and forms a "strong" solution. As the slime is carried around past the top position, more water is fed to the same by means hereinafter described and the liquid which then passes through the barrel falls into the compartment *g* of the receptacle *d* and forms a "weak" solution. The final washing water is fed on to the barrel from a pipe *q* as hereinafter described or the bottom of the barrel may dip into a water tank *r* which causes the slime to be further washed and the liquid passing through into the space *h* in the barrel from this source forms what is known as "wash" water.

The means for feeding the water on to the top of the barrel is shown as comprising a water supply pipe *s* perforated along its length and a roller *t* covered with felt or the like on to which the water is discharged. This roller is in contact with the filtering surface *b* and is rotated thereby, the action of said roller being to thoroughly spread the water and insure even feeding of the same to the barrel surface. The device for spreading the water discharged from the water pipe *q* is shown as comprising a gauze or other perforated roller *u* encircling the pipe and in contact with the barrel surface. Of course either of these spreading devices may be used in either position. Further the spreading action may be effected by reciprocating the perforated supply pipes longitudinally the rollers *t* and *u* being still retained or dispensed with as desired. Means for effecting the reciprocation of one of these pipes is shown at the left of Fig. 5 and comprise a cam plate *v* adapted to oscillate one end of a lever *w* pivoted to a fixed pivot *y*, the other end of said lever being adapted to reciprocate the pipe.

Three fixed conduits 2, 3 and 4 pass axially out of the barrel *a*, said conduits dipping respectively into the liquids contained in the compartments *f* and *g* and the space *h*. These conduits are provided for drawing off the solutions and also for maintaining the suction within the barrel and are preferably formed as a single pipe, where they pass through the barrel bearing, divided into three channels. The conduits are either connected to separate compartments of a common tank having an air pump connected to its top or a separate pump and tank may be used to draw off each liquid.

Referring now to Fig. 4 which shows a modified arrangement for the knife, when feeding the slime on to the bottom of the barrel, said knife *o* is arranged on the descending side of the barrel *a* the lower end 5 dipping into the slime in the container *r* and the upper or knife edge *m* being arranged in close proximity to the filtering surface. End plates, as described above with the other arrangement of knife, are secured to the knife and provided with front edges shaped to suit the curvature of the barrel. With this arrangement the slime is fed on to the bottom part of the barrel and the knife together with its end plates, forms a shield for the scraped part of the filtering surface. The slime will rise into this shield owing to the suction through the filtering surface from the inside of the barrel, said suction also keeping the shield pressed toward the barrel. By this means no air can leak through this part of the barrel. Should the level of the slime in the container *r* vary slightly it will not effect the amount of slime fed on to the filtering surface but, if desired, a regulation of the level may be effected by an overflow device as described above. With the feed arranged in this manner it will be understood that the bottom part of the barrel will extract the "strong" solution and the divided receptacle *d* will catch the "weak" solution and "wash" water from the upper part of the filtering surface.

The water feed pipes will be arranged of course substantially at 6 and 7 respectively.

In order to insure that the knife or scraper *o* removes the residue from the filtering surface in an even manner and without forming grooves or ridges thereon, it is preferably adapted to reciprocate slightly in a longitudinal direction. This may be effected by the cam *v* adapted to oscillate one end of the lever *w'*, pivoted at *y'*, as shown at the right of Fig. 5, said lever being connected at its other end to the upper end of the knife *o*. When the knife *o* is reciprocated in this manner, the end plates attached to it may be formed of rubber or other resilient material.

Having now described my invention what I claim as new and desire to secure by Letters Patent is:—

1. A machine for separating liquids from materials and for washing and saturating materials with liquids comprising a continuous cylindrical filtering surface, means for rotating said surface, means for constantly exerting a uniform suction within said surface, stationary means for applying the material to said surface, stationary devices spaced from said applying means and from one another, for applying a washing medium to the material at a plurality of points and stationary means for separately catching and withdrawing the filtrates which pass through the filtering means between the points of application of the material and washing medium.

2. A machine for separating liquids from materials and for washing and saturating materials with liquids comprising a continuous filtering surface, means for rotating said surface, means for exerting a suction upon said filtering surface, a knife forming with the filtering surface a container for the material whereby the latter is fed on to said surface, an edge to said knife for removing the residue from the filtering surface and means for catching the filtrate which passes through said filtering surface.

3. A machine for separating liquids from materials and for washing and saturating materials with liquids, comprising a continuous filtering surface, means for rotating said surface, means for exerting a suction upon said filtering surface, a container from which the material is applied to the filtering means, a knife for removing the residue from the filtering surface, means for reciprocating said knife longitudinally, and means for catching the filtrate which passes through said filtering surface.

4. A machine for separating liquids from materials and for washing and saturating materials with liquids, comprising a cylindrical filtering surface, means for exerting a suction within said surface, means for rotating said surface, a knife forming with said filtering surface a container for the material whereby it is fed on to the said surface, an edge to said knife for removing the residue from the filtering surface, stationary means, spaced from said container, for applying a washing medium to the material, and means for separating the filtrates which respectively pass through the filtering surface before reaching the point of application of the washing medium, and after passing said point.

5. A machine for separating liquids from materials and for washing and saturating materials with liquids, comprising a cylindrical filtering surface, means for exerting a suction within said surface, means for rotating said surface, a container from which the material is applied to the filtering means, a knife for removing the residue from the filtering surface, means for reciprocating said knife longitudinally, stationary means spaced from said container, for applying a washing medium to the material, and means for separating the filtrates which respectively pass through the filtering surface before reaching the point of application of the washing medium and after passing said point.

6. A machine for separating liquids from materials and for washing and saturating materials with liquids, comprising a continuous surface for filtering the material, means for applying the material to said filtering surface to effect initial filtration thereof, a supply pipe for a washing medium spaced from said applying means, a distributing roller engaging the filtering surface and arranged to receive the washing medium from said pipe, and means for separating the initial filtrate from the filtrate which passes through the filtering surface subsequent to the application of the washing medium thereto.

7. A machine for separating liquids from materials and for washing and saturating materials with liquids, comprising a cylindrical filtering surface, means for exerting a suction within said surface, means for rotating said surface, stationary means for applying the material to said surface, a supply pipe for a washing medium spaced from said applying means, a distributing roller engaging the filtering surface and arranged to receive the washing medium from said pipe, and means for separating the filtrates which respectively pass through the filtering surface before reaching the point of contact of the distributing roller and after passing said point.

8. A machine for separating liquids from materials and for washing and saturating materials with liquids, comprising a continuous filtering surface, means for rotating said surface, means for exerting a suction upon said filtering surface, means for applying the material to said surface, a supply pipe for a washing medium spaced from said applying means, spaced orifices in said pipe through which the washing medium passes on to the filtering surface, means for reciprocating said pipe, and means for catching the filtrate which passes through said filtering surface.

9. A machine for separating liquids from materials and for washing and saturating materials with liquids, comprising a cylindrical filtering surface, means for rotating said surface, means for applying the material to the outer side of said surface to effect initial filtration thereof, means for applying a washing medium to the material subsequent to said initial filtration whereby a subsequent filtration occurs, projections on the inner side of the filtering surface from which the filtrates drip and means into which the filtrates drip for separating the initial and subsequent filtrates.

10. A machine for separating liquids from materials and for washing and saturating materials with liquids, comprising a cylindrical filtering surface, means for constantly exerting a uniform suction within the whole of said filtering surface, means for rotating said surface, stationary means for applying the material to said surface, stationary means spaced from said applying means for applying a washing medium to the material, stationary means for separately catching the filtrates which respectively pass through the filtering means before reaching the point of application of the washing medium and after passing said point, and means for withdrawing the separated filtrates from the said stationary means for catching the filtrates, during the operation of the machine.

11. A machine for separating liquids from materials and for washing and saturating materials with liquids comprising a cylindrical filtering surface, means for constantly exerting a suction within the whole of said filtering surface, means for rotating said surface, stationary means for applying the material to said surface, stationary means spaced from said applying means for applying a washing medium to the material and a stationary receptacle divided into a plurality of compartments arranged within the filtering surface for catching and separating the filtrates which respectively pass through the filtering means before reaching the point of application of the washing medium and after passing said point.

12. A machine for separating liquids from materials and for washing and saturating materials with liquids comprising a cylindrical filtering surface, means for constantly exerting a suction within the whole of said filtering surface, means for rotating said surface, stationary means for applying the material to said surface, stationary means spaced from said applying means for applying a washing medium to the material, a stationary receptacle divided into a plurality of compartments arranged within the filtering surface for receiving and separating the filtrates which respectively pass through the filtering means before reaching the point of application of the washing medium and after passing said point, and pipes communicating with the compartments of the stationary receptacle and with the lower portion of the interior of the cylindrical filtering surface for withdrawing the separated filtrates during the operation of the machine.

In testimony whereof I have signed my name to this specification in the presence of two subscribing witnesses.

THOMAS BREAKELL.

Witnesses:
M. F. STARLING,
W. J. SKERTEN.